United States Patent [19]

Sugiura

[11] Patent Number: 4,590,885
[45] Date of Patent: May 27, 1986

[54] COLLAPSIBLE ANIMAL CAGE

[75] Inventor: Masami Sugiura, Fuji, Japan

[73] Assignee: Tokyo Petcage Co., Ltd., Tokyo, Japan

[21] Appl. No.: 285,282

[22] Filed: Jul. 20, 1981

Related U.S. Application Data

[63] Continuation of Ser. No. 94,445, Nov. 15, 1979, abandoned.

[30] Foreign Application Priority Data

Dec. 7, 1978 [JP] Japan ................................ 53-168854

[51] Int. Cl.⁴ ............................................. A01K 31/08
[52] U.S. Cl. .................................................... 119/19
[58] Field of Search ....................... 119/19, 17, 18, 15; 220/4, 6, 7

[56] References Cited

U.S. PATENT DOCUMENTS

| 1,040,489 | 10/1912 | Baker | 119/19 |
| 3,048,147 | 8/1962 | McKean | 119/19 |
| 3,324,831 | 6/1967 | St. Onge | 119/19 |

Primary Examiner—Jay N. Eskovitz
Attorney, Agent, or Firm—Zarley, McKee, Thomte, Voorhees & Sease

[57] ABSTRACT

A collapsible animal cage wherein a cover frame includes two pairs of pivot projections, each pair of which extend downwards at different distances from sides of each end. A pair of side plates, one of which is higher than the other, upper parts of them are pivotally mounted to the pivot projections of the cover frame. Upper parts of a pair of end plates are also pivotally mounted to the cover frame and lower parts of the end plates are fixed to the side plates and are detachable therefrom. A bottom plate is inserted into bottom grooves formed in the lower ends of the side plates. A carry handle may be attached to one of the side parts of the cover frame.

4 Claims, 10 Drawing Figures

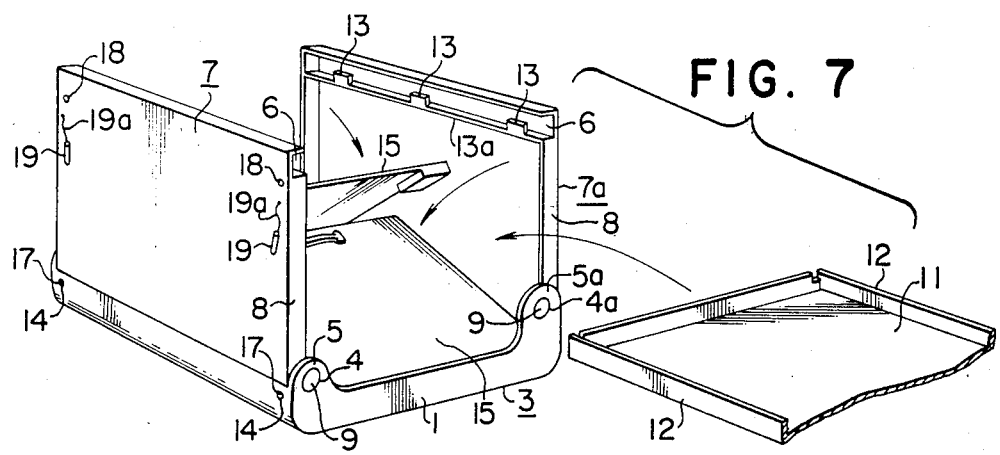
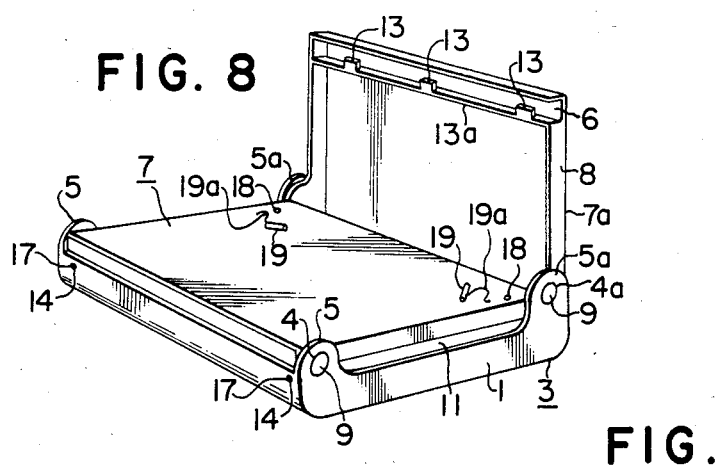
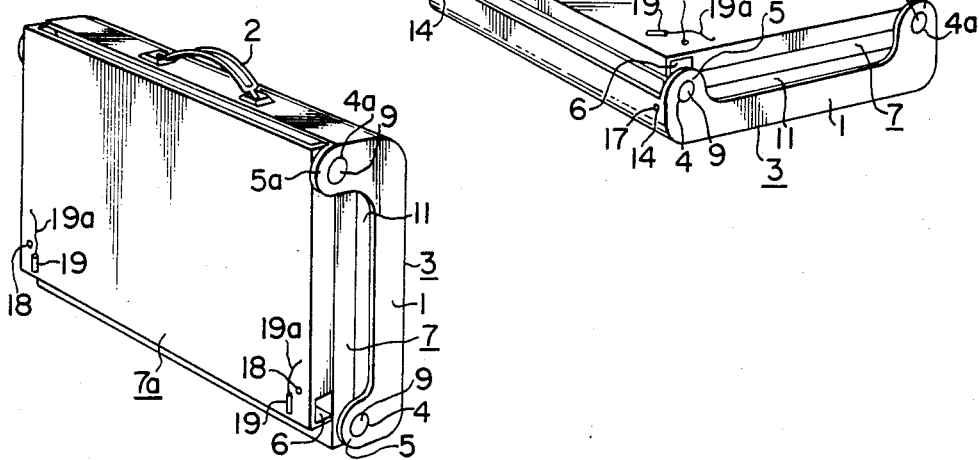

COLLAPSIBLE ANIMAL CAGE

This is a continuation of application Ser. No. 094,445 filed Nov. 15, 1979, now abandoned.

BACKGROUND OF THE INVENTION

This invention relates to a collapsible cage for animals such as dogs, cats, chickens, birds, and the like. A conventional cage made of metallic net is rather heavy to handle, and a work that takes plenty of time is required for making it. A pet animal kept in such a conventional cage in the house often scatters hairs fell off the body and a bad smell, and the sanitary conditions is not good. Further, the animal in the conventional cage is sometimes disturbed by surroundings and cannot feel peace or calmness of mind.

SUMMARY OF THE INVENTION

Therefore, it is an object of the present invention to provide a collapsible animal cage free from the aforementioned disadvantages, which is compact and reliable.

According to the present invention there is provided a collapsible animal cage comprising: a cover frame having two pairs of pivot projections, each pair of which extend downwards at different distances from both sides of each end, the two lower pivot projections being positioned in one side of the cover frame and the two higher pivot projections in the other side; a pair of side plates, one of which is higher than the other, each having a bottom groove in its lower end, the upper parts of the higher and the lower side plates being pivotally mounted to the lower and the higher pivot projections of the cover frame; a pair of end plates whose upper parts are pivotally mounted to the end portions of the cover frame and whose lower parts are fixed to the side plates and are detachable therefrom; and a bottom plate which is slidably inserted in the bottom grooves of the side plates.

BRIEF DESCRIPTION OF THE DRAWINGS

Other and more specific objects, features and advantages of the present invention will appear from the following detailed description of a preferred embodiment thereof with reference to the accompanying drawings, in which:

FIG. 7 is a schematic view of a cage of the present invention for explaining its folding method;

FIG. 8 is a schematic view of a cage of the present invention for explaining its folding method;

FIG. 9 is a schematic view of a cage of the present invention, completely folded; and FIG. 10 is a perspective view of a collapsible animal cage of the present invention, which is carried by holding a handle.

DESCRIPTION OF THE PREFERRED EMBODIMENT

Figure 1:
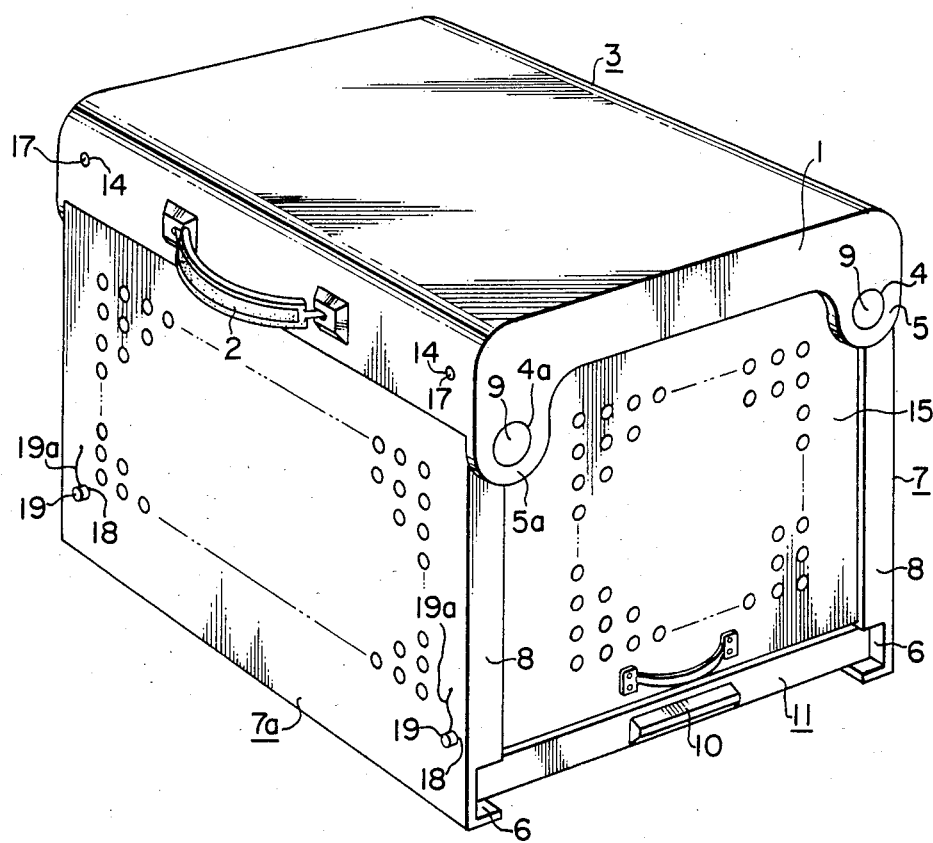
FIG. 1 is a perspective view of a collapsible animal cage according to the present invention.

Referring to the drawings there is shown a collapsible animal cage according to the present invention.

A cover frame 3 includes a pair of front and rear end parts 1 extending downwards, a carry handle 2 mounted to one of side parts extending downwards, and two pairs of pivot projections 5, 5a having pivot holes 4, 4a in their centers, the pair of which project integrally downwards at different distances from the lower side ends of the front or the rear end part 1, i.e., in the case of FIG. 1, the left pivot hole 4a and the left projection 5a are positioned lower than the right pivot hole 4 and the right projection 5, respectively.

Figure 6:
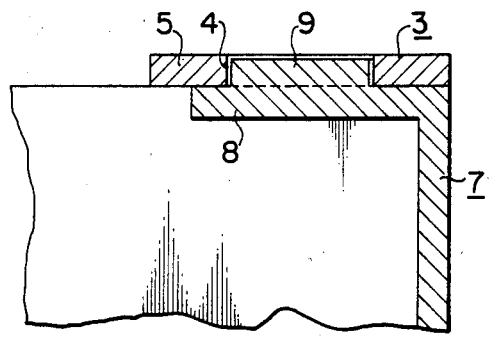
FIG. 6 is a fragmentary longitudinal cross-section, taken along the line VI—VI in FIG. 3.

A pair of side plates 7, 7a generally having small openings for ventilation, the plate 7 being longer than the plate 7a in the longitudinal direction in FIG. 1, each side plate is provided with a bottom groove 6 in the lower end, a pair of side projections 8 which extend towards each other one perpendicular to the side plate 7 or 7a, and a pair of pivot shafts 9 mounted to the top of the side projections 8. The side plates 7, 7a are pivotally mounted to the cover frame 3 by inserting the pivot shafts 9 in the pivot holes 4, 4a, as clearly shown in FIG. 6. The length of the longer side plate 7 in the longitudinal direction is restricted so that the plate 7 may be folded inside safely without contacting with the other side plate 7a, as hereinafter described.

Figure 2:
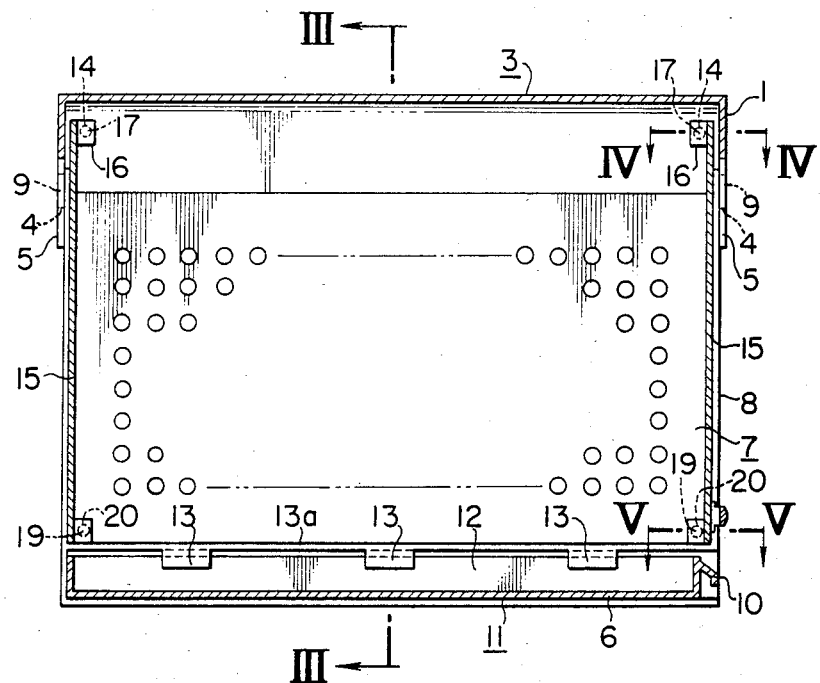
FIG. 2 is a central longitudinal cross-section in FIG. 1.
Figure 3:
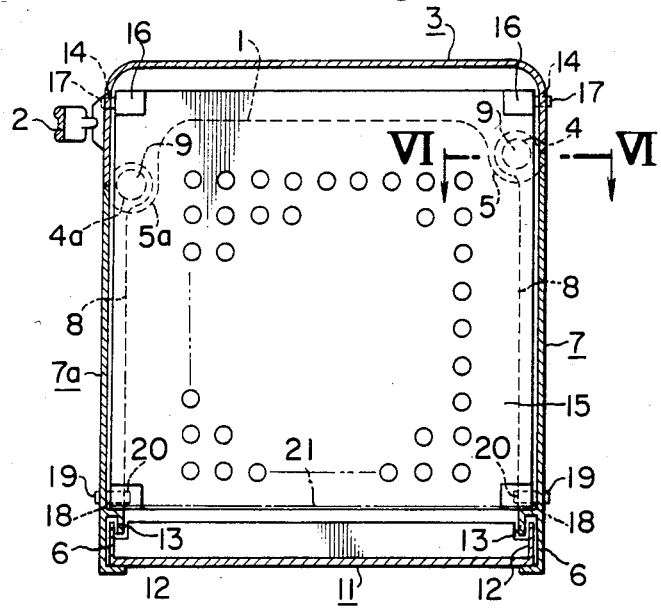
FIG. 3 is a longitudinal cross-section, taken along the line III—III in FIG. 2.

A bottom plate or dish 11 having a handle 10 in its front end is inserted in the bottom grooves 5. Inside side walls 12 of the bottom dish 11 several stop pieces 13 for preventing the bottom dish 11 from moving in the side directions extend downwards from a free end of a horizontal lower step 13a mounted to the lower inner surface of the side plate 7 or 7a, as clearly shown in FIGS. 2 and 3. Hence the side plates 7, 7a may not be opened outwards while the bottom dish 11 is fitted in the bottom grooves 6 of the side plates.

Figure 4:
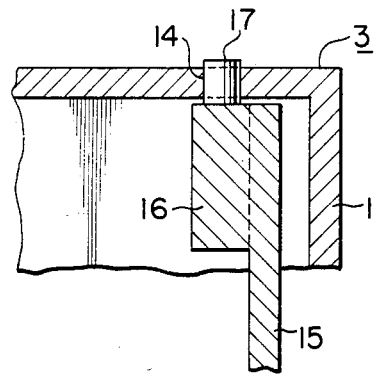
FIG. 4 is a fragmentary longitudinal cross-section, taken along the line IV—IV in FIG. 2.
Figure 5:
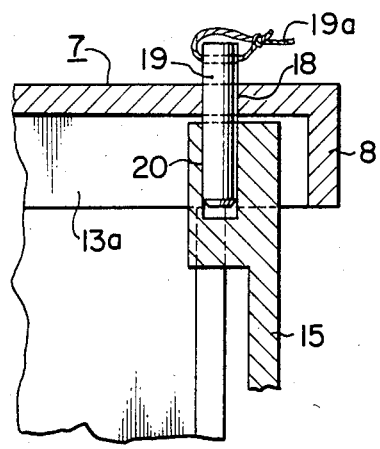
FIG. 5 is a fragmentary longitudinal cross-section, taken along the line V—V in FIG. 2.

A pair of front and rear end plates 15 generally having small openings for ventilation are pivotally mounted to the cover frame 3 by fitting pairs of pivot shafts 17 in upper side holes 14 formed in the front and rear portions of the side parts of the cover frame 3, the pivot shafts 17 extending outwards from brackets 16 mounted to the top side ends of the plates 15, as clearly shown in FIG. 4. The lower free end of the front or rear end plate 15 is fixed by inserting pins 19 which are attached to the lower outer surface of the side plate 7 or 7a by strings 19a, into stop holes 20 formed at the lower side end of the front or rear end plate 15 through lower side holes 18 formed in the lower portion of the side plate 7 or 7a. The lower ends of the plates 15 extend slightly above the top end of the bottom dish 11 so as not to contact therewith. The front plate 15 may be provided with a handle for opening and closing, as shown in FIG. 1. One of or both the front and rear end plates 15 may be made of a metallic net. A net plate or a hurdle 21 may be laid between the lower steps 13a of the side plates 7, 7a, as shown by a imaginary line in FIG. 3.

The cover frame 3, the side plates 7, 7a, the front and rear end plates 15, and the bottom dish 11 are preferably molded in a plastic material, which are light and convenient for handling.

An animal is put into the cage of the present invention from the front or rear end plate 15 by pivoting upwards after pulling out the pins 19 from the stop holes 20 of the plates 15 through the lower holes 18 of the side plates 7, 7a. Thereafter, the pins 19 are again engaged with the stop holes 20 of the plates 15. A door may be provided with the front or the rear end plate 15.

When the cage is not used or the empty cage is transferred, it is preferably folded. In FIGS. 7-9, there is shown a folding method of the cage of the present invention.

First, the cage is turned upside down, and the bottom dish 11 is pulled out of the bottom grooves 6 and is put in the upset cage. Then, the pins 19 are released from the stop holes 20 of the front and rear end plates 15 via the lower side holes 18, and the plates 15 are turned down inside, as shown in FIG. 7. The side plate 7 of which the length in the longitudinal direction is longer than the other side plate 7a, is first turned down inside, as shown in FIG. 8, and the other plate 7 is then turned down inside, as shown in FIG. 9. Thus the folded cage shown in FIG. 10 is carried by holding the handle 2. The folded cage is assembled again in the reverse order of the steps described above.

Although the present invention has been described with reference to a preferred embodiment thereof, various changes and modifications can be made by those skilled in the art without departing from the scope of the present invention.

What is claimed is:

1. A collapsible animal cage comprising:

a cover frame having two pairs of pivot projections, each pair of which extend downwards at different distances from both sides of each end, the two lower pivot projections being positioned in one side of the cover frame and the two higher pivot projections in the other side;

a pair of side plates, one of which is higher than the other, each having a bottom groove in its lower end, the upper parts of the higher and the lower side plates being pivotally mounted to the lower and the higher pivot projections of the cover frame;

a pair of end plates whose upper parts are pivotally mounted to the end portions of the cover frame and whose lower parts are fixed to the side plates and are detachable therefrom; and a bottom plate which is slidably inserted in the bottom grooves of the side plates.

2. A cage according to claim 1, wherein a carry handle is mounted to one of sides of the cover frame.

3. A cage according to claim 1 or 2, wherein the lower parts of the end plates are fixed to the side plates by inserting detachable pins in stop holes formed in the end plates via side holes formed in the side plates.

4. A cage according to claim 3, wherein the end plates are made of metallic net.

* * * * *